(12) United States Patent
Golsch (10) Patent No.: US 11,548,517 B2
(45) Date of Patent: Jan. 10, 2023

(54) ACTIVATING VEHICLE FUNCTIONS BASED ON VEHICLE OCCUPANT LOCATION

(71) Applicants: DENSO International America, Inc., Southfield, MI (US); DENSO CORPORATION, Kariya (JP)

(72) Inventor: Kyle Golsch, Pontiac, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 643 days.

(21) Appl. No.: 16/359,066

(22) Filed: Mar. 20, 2019

(65) Prior Publication Data

US 2019/0300006 A1 Oct. 3, 2019

Related U.S. Application Data

(60) Provisional application No. 62/648,981, filed on Mar. 28, 2018.

(51) Int. Cl.
*B60W 50/00* (2006.01)
*H04W 76/10* (2018.01)
(Continued)

(52) U.S. Cl.
CPC ..... *B60W 50/0098* (2013.01); *B60H 1/00964* (2013.01); *B60N 2/0248* (2013.01);
(Continued)

(58) Field of Classification Search
CPC .................. B60W 2050/0077; B60W 50/0098
See application file for complete search history.

(56) References Cited

U.S. PATENT DOCUMENTS

| 8,930,045 B2 | 1/2015 | Oman et al. |
| 9,123,244 B2 | 9/2015 | Daman et al. |

(Continued)

FOREIGN PATENT DOCUMENTS

| BR | 102014017465 A2 | 2/2016 |
| CN | 104574593 A | 4/2015 |

(Continued)

*Primary Examiner* — Peter D Nolan
*Assistant Examiner* — Ce Li Li
(74) *Attorney, Agent, or Firm* — Harness, Dickey & Pierce, P.L.C.

(57) ABSTRACT

Systems and methods are provided and include a communication gateway of a control module. The communication gateway establishes wireless communication connections with a plurality of user devices. A plurality of sensors are configured to, in response to the plurality of user devices being connected to the communication gateway, communicate signal information about the wireless communication connections to the control module. The signal information indicates characteristics of the wireless communication connections. The control module (i) determines a location of each user device of the plurality of user devices based on the signal information and (ii) generates a plurality of entries based on the signal information. Each entry of the plurality of entries corresponds to each of the plurality of user devices. A user settings activation module (i) determines user profiles corresponding to each entry of the plurality of entries and (ii) activates at least one vehicle function based on the user profiles.

12 Claims, 6 Drawing Sheets

(51) Int. Cl.

| | | |
|---|---|---|
| *H04L 29/08* | (2006.01) | |
| *B60N 2/02* | (2006.01) | |
| *B60N 2/16* | (2006.01) | |
| *B60H 1/00* | (2006.01) | |
| *H04L 67/12* | (2022.01) | |
| *H04L 67/306* | (2022.01) | |
| *B60R 16/037* | (2006.01) | |
| *G07C 9/00* | (2020.01) | |
| *B60R 25/24* | (2013.01) | |
| *H04W 4/40* | (2018.01) | |

(52) U.S. Cl.
CPC .............. *B60N 2/16* (2013.01); *B60R 16/037* (2013.01); *B60R 25/24* (2013.01); *G07C 9/00309* (2013.01); *H04L 67/12* (2013.01); *H04L 67/306* (2013.01); *H04W 4/40* (2018.02); *H04W 76/10* (2018.02); *B60W 2050/0075* (2013.01); *B60W 2540/00* (2013.01); *B60W 2556/45* (2020.02); *G07C 2009/00793* (2013.01); *G07C 2209/63* (2013.01)

(56) References Cited

U.S. PATENT DOCUMENTS

| | | | |
|---|---|---|---|
| 9,688,247 B1 | 6/2017 | Jayaraman et al. | |
| 9,794,753 B1 | 10/2017 | Stitt et al. | |
| 9,894,492 B1 | 2/2018 | Elangovan et al. | |
| 10,002,479 B2 | 6/2018 | Oz et al. | |
| 2008/0048829 A1 | 2/2008 | Nakajima et al. | |
| 2011/0215921 A1 | 9/2011 | Ben Ayed et al. | |
| 2012/0045058 A1 | 2/2012 | Weghaus | |
| 2013/0214732 A1 | 8/2013 | Nowottnick | |
| 2013/0297099 A1* | 11/2013 | Rovik .................. B60R 16/037 701/2 |
| 2014/0152091 A1 | 6/2014 | Muller et al. | |
| 2014/0188348 A1 | 7/2014 | Gautama et al. | |
| 2014/0222298 A1* | 8/2014 | Gurin .................. B60R 25/305 701/49 |
| 2014/0240091 A1 | 8/2014 | Talty et al. | |
| 2014/0274013 A1 | 9/2014 | Santavicca | |
| 2014/0309806 A1* | 10/2014 | Ricci .................. G06F 21/32 701/1 |
| 2014/0309870 A1* | 10/2014 | Ricci .................. A61B 5/6808 701/36 |
| 2014/0330449 A1 | 11/2014 | Oman et al. | |
| 2015/0148989 A1 | 5/2015 | Cooper et al. | |
| 2015/0161832 A1 | 6/2015 | Esselink et al. | |
| 2015/0161834 A1 | 6/2015 | Spahl et al. | |
| 2015/0204965 A1 | 7/2015 | Magarida et al. | |
| 2015/0310681 A1 | 10/2015 | Avery et al. | |
| 2015/0356797 A1 | 12/2015 | McBride et al. | |
| 2016/0050563 A1 | 2/2016 | Bronk | |
| 2016/0063786 A1 | 3/2016 | Lewis et al. | |
| 2016/0087485 A1 | 3/2016 | Maeda et al. | |
| 2016/0107611 A1 | 4/2016 | Siswick et al. | |
| 2016/0150407 A1 | 5/2016 | Michaud et al. | |
| 2016/0337814 A1* | 11/2016 | Van Wiemeersch .. H04W 4/025 |
| 2017/0018128 A1 | 1/2017 | Berezin et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0236351 A1 | 8/2017 | Menard et al. | |
| 2017/0278326 A1* | 9/2017 | DeCia .................. G01S 5/0257 |
| 2017/0303080 A1 | 10/2017 | Stitt et al. | |
| 2017/0303090 A1 | 10/2017 | Stitt et al. | |
| 2017/0309098 A1 | 10/2017 | Watters et al. | |
| 2017/0318612 A1* | 11/2017 | Gu .................. H04W 76/11 |
| 2017/0330402 A1 | 11/2017 | Menard et al. | |
| 2018/0029560 A1 | 2/2018 | Mohaupt et al. | |
| 2018/0084371 A1* | 3/2018 | Scagnol .................. H04W 4/80 |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |
| 2020/0269809 A1 | 8/2020 | Sanji et al. | |

FOREIGN PATENT DOCUMENTS

| | | |
|---|---|---|
| EP | 2800068 A2 | 11/2014 |
| FR | 3026212 A1 | 3/2016 |
| JP | 2003248045 A | 9/2003 |
| JP | 2007303167 A | 11/2007 |
| JP | 2014196055 A | 10/2014 |
| JP | 2016120865 A | 7/2016 |
| JP | 2016528082 A | 9/2016 |
| JP | 2016215817 A | 12/2016 |
| JP | 2016220401 A | 12/2016 |
| JP | 2017118474 A | 6/2017 |
| WO | WO-2014006745 A1 | 1/2014 |
| WO | WO-2015177298 A1 | 11/2015 |
| WO | WO-16156682 A1 | 10/2016 |
| WO | WO-2017/181035 A1 | 10/2017 |
| WO | WO-2017/181050 A1 | 10/2017 |
| WO | WO-18040641 A1 | 3/2018 |

* cited by examiner

ACTIVATING VEHICLE FUNCTIONS BASED ON VEHICLE OCCUPANT LOCATION

CROSS-REFERENCE TO RELATED APPLICATION

This application claims the benefit of U.S. Provisional Application No. 62/648,981, filed on Mar. 28, 2018. The entire disclosure of the above application is incorporated herein by reference.

FIELD

The present disclosure relates to systems and methods for activating vehicle functions based on a number of occupants of the vehicle and a location of the occupants within the vehicle.

BACKGROUND

This section provides background information related to the present disclosure which is not necessarily prior art.

Traditionally, a passive entry/passive start (PEPS) system, which is a vehicle system that includes a keyless entry system, allows anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the Key Fob. If the Key Fob can be authenticated and is located within an authorizing zone, certain vehicle functions are made available to the user (e.g., doors are unlocked or vehicle is started).

Traditional PEPS systems use proprietary grade radio protocols using low frequency (LF) signals of approximately 125 kHz. Traditional PEPS systems are also hampered by the physics of the LF systems. LF was selected by early PEPS systems because the wave propagation allows for relatively accurate estimation of range and location by using signal strength within the typical target activation range of 2 meters. However, due to the extremely long wavelength of the LF signal compared to the size of a practical vehicle antenna and key fob receiver, it is difficult within reasonable power consumption and safe transmit power levels to reliably communicate with a key fob using LF beyond a few meters. Consequently, it is difficult to make any of the vehicle's functions available to the user when the key fob is located more than a few meters away from the vehicle.

Furthermore, it is desirable to allow users to use their smart devices, such as smartphones and other devices, such as wearable devices, to activate certain vehicle functions. As an example, it is desirable to activate certain vehicle functions based on a user profile associated with a user of the user device, and the vehicle functions may include, for example, setting mirror positions when the user is identified as the driver of the vehicle, adjusting a steering wheel position when the user is identified as the driver of the vehicle, adjusting a seat position of the user, modifying climate control settings, and adjusting media and/or audio settings. Such systems and advantages are not achievable with traditional PEPS systems because each vehicle manufacturers and PEPS system suppliers traditionally implement proprietary closed systems using radio frequencies that are not used by ubiquitous devices, such as smart phones.

SUMMARY

This section provides a general summary of the disclosure, and is not a comprehensive disclosure of its full scope or all of its features.

The present disclosure provides a system that includes a communication gateway of a control module of a vehicle, and the communication gateway is configured to establish wireless communication connections with a plurality of user devices. The system includes a plurality of sensors that are configured to, in response to the plurality of user devices being connected to the communication gateway, communicate signal information about the wireless communication connections to the control module. The signal information indicates characteristics of the wireless communication connections. The control module includes at least one processor that is configured to execute instructions stored in a non-transitory memory, and the control module is configured to (i) determine a location of each user device of the plurality of user devices based on the signal information and (ii) generate a plurality of entries based on the signal information. Each entry of the plurality of entries corresponds to each of the plurality of user devices. The system includes a user settings activation module that is implemented by the at least one processor of the control module. The user settings activation module is configured to (i) determine user profiles corresponding to each entry of the plurality of entries and (ii) activate at least one vehicle function based on the user profiles.

In some configurations, each entry of the plurality of entries further comprises signal information from a plurality of door sensors, and the signal information from the plurality of door sensors indicates a door of entry for each of the plurality of user devices.

In some configurations, each entry of the plurality of entries further comprises identifying information associated with each of the plurality of user devices.

In some configurations, the location of each user is one of a driver-side front seat of the vehicle, a passenger-side front seat of the vehicle, and a rear seating row of the vehicle.

In some configurations, the rear seating row includes at least one of a driver-side rear seat, a passenger-side rear seat, and a middle rear seat.

In some configurations, in response to a first user profile of the user profiles being associated with a driver of the vehicle, activating the at least one vehicle function includes at least one of adjusting a mirror of the vehicle, adjusting a steering wheel of the vehicle, applying speed limits to the vehicle, applying zone limits to the vehicle, and applying acceleration limits to the vehicle.

In some configurations, the wireless communication connections are Bluetooth low energy (BLE) communication connections.

In some configurations, activating the at least one vehicle function includes at least one of adjusting (i) a seat position, (ii) a seat height, (iii) climate conditions of the vehicle, (iv) media settings, and (v) audio settings.

In some configurations, the signal information includes a received signal strength (RSSI) of each of the wireless communication connections.

In some configurations, the signal information includes at least one of a time difference of arrival of each of the wireless communication connections, a time of arrival of each of the wireless communication connections, an angle of arrival of each of the wireless communication connections, and a round trip time of flight of each of the wireless communication connections.

Additionally, the present disclosure provides a method that includes establishing, using a communication gateway of a control module of a vehicle, wireless communication connections with a plurality of user devices, and the control module includes at least one processor that is configured to execute instructions stored in a nontransitory memory. The method further includes communicating, in response to the plurality of user devices being connected to the communication gateway and using a plurality of sensors, signal information about the wireless communication connections to the control module. The signal information indicates characteristics of the wireless communication connections. The method further includes determining, using the control module, a location of each user of the plurality of user devices based on the signal information. The method includes generating, using the control module, a plurality of entries based on the signal information, and each entry of the plurality of entries corresponds to each of the plurality of user devices. The method includes determining, using a user settings activation module that is implemented by the at least one processor of the control module, user profiles corresponding to each entry of the plurality of entries. The method further includes activating, using the user settings activation module, at least one vehicle function based on the user profiles.

In some configurations, each entry of the plurality of entries further comprises signal information from a plurality of door sensors, and the signal information from the plurality of door sensors indicates a door of entry for each of the plurality of user devices.

In some configurations, each entry of the plurality of entries further comprises identifying information associated with each of the plurality of user devices.

In some configurations, the location of each user is one of a driver-side front seat of the vehicle, a passenger-side front seat of the vehicle, and a rear seating row of the vehicle.

In some configurations, the rear seating row includes at least one of a driver-side rear seat, a passenger-side rear seat, and a middle rear seat.

In some configurations, in response to a first user profile of the user profiles being associated with a driver of the vehicle, the method includes activating the at least one vehicle function includes at least one of adjusting a mirror of the vehicle, adjusting a steering wheel of the vehicle, applying speed limits to the vehicle, applying zone limits to the vehicle, and applying acceleration limits to the vehicle.

In some configurations, activating the at least one vehicle function includes at least one of applying (i) speed limits of the vehicle, (ii) zone limits of the vehicle, and (iii) acceleration limits of the vehicle.

In some configurations, wherein the wireless communication connections are Bluetooth low energy (BLE) communication connections.

In some configurations, the signal information includes a received signal strength (RSSI) of each of the wireless communication connections.

In some configurations, the signal information includes at least one of a time difference of arrival of each of the wireless communication connections, a time of arrival of each of the wireless communication connections, an angle of arrival of each of the wireless communication connections, and a round trip time of flight of each of the wireless communication connections.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems, methods, and architecture to implement a localization system, such as a PEPS system, using a consumer grade wireless protocol, such as, for example, a consumer grade wireless protocol based on the standardized specification of the Bluetooth Consortium. Specifically, the present disclosure relates to a PEPS system using a Bluetooth Low Energy (BLE) communication protocol for communication between the vehicle and BLE-enabled user devices, such as a smartphone or a wearable device. Specifically, the PEPS system includes a sensor network that is configured to find existing connections between user devices and the vehicle and to measure the timing and signal characteristics of the communication between the user devices and the vehicle. Alternatively, while the present disclosure describes establishing a wireless communication connection using Bluetooth or BLE, the systems and methods described herein could be used with other wireless communication protocols, such as Wi-Fi, Wi-Fi direct, ultra-wide band (UWB) communication, and/or impulse-radio (IR) UWB communication.

Further, the PEPS system also includes a central module that collects received signal strengths measured by the sensor network, and based on the received signal strengths, the central module may determine whether a corresponding user of the user devices has entered the vehicle. Additionally, the central module is configured to determine, based on a plurality of door sensors, when and through which door the corresponding user of the user devices entered the vehicle. Subsequently, the PEPS system may activate certain vehicle functions based on a user profile associated with the corresponding users of the user devices inside the vehicle, the number of corresponding users, and/or the time of entry associated with the corresponding users.

Figure 1:
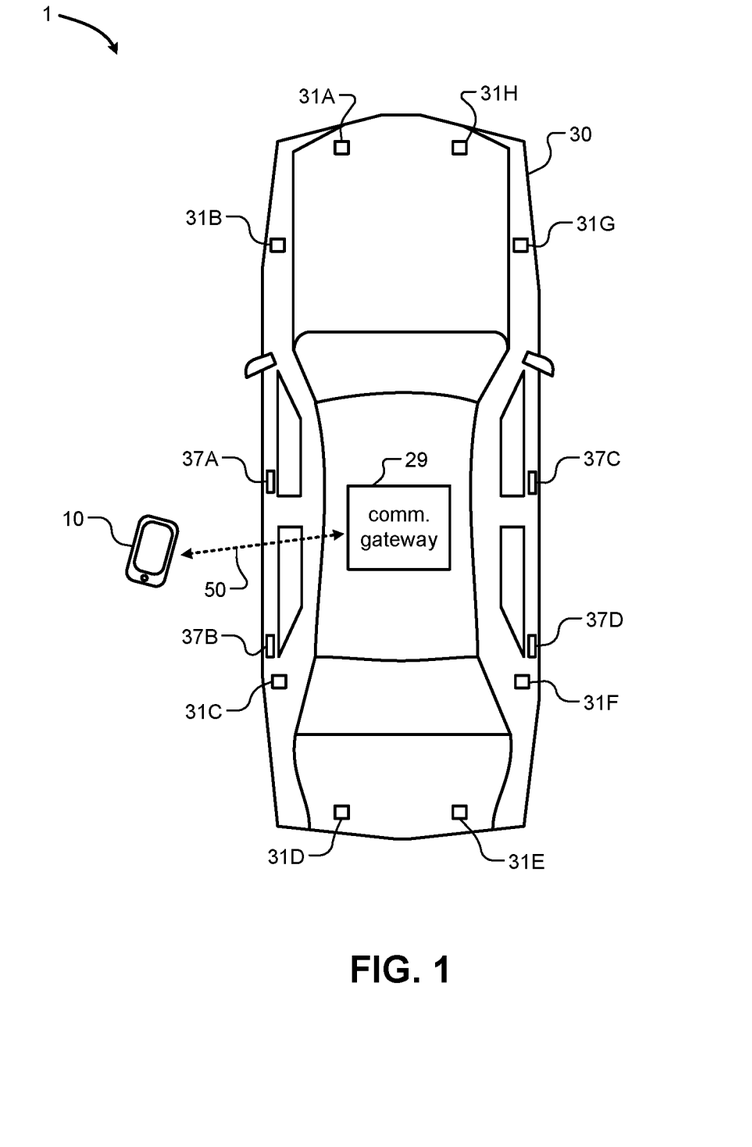
FIG. 1 illustrates a subject vehicle with a PEPS system according to the present disclosure.
Figure 2:
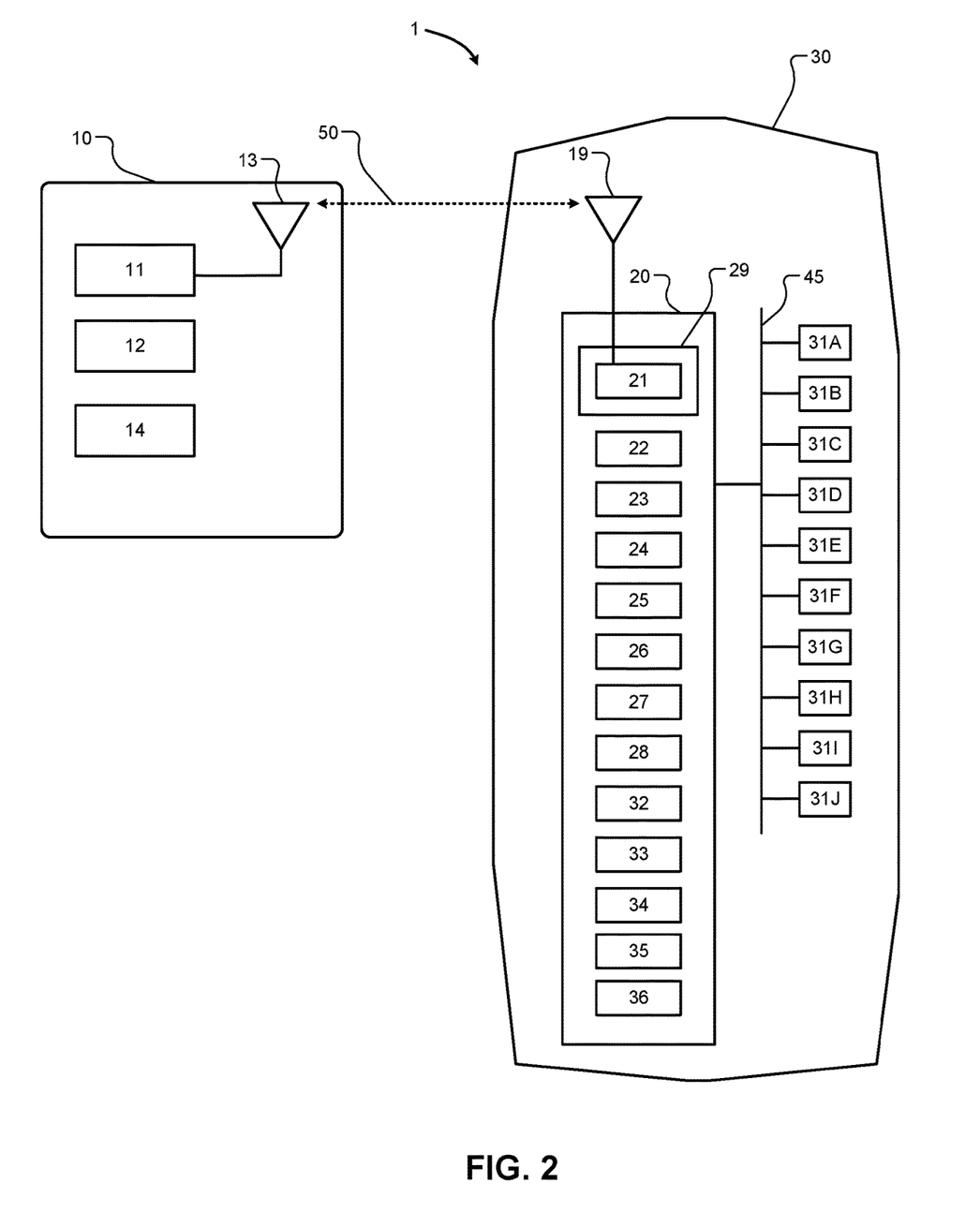
FIG. 2 illustrates a block diagram for a PEPS system according to the present disclosure.

With reference to FIGS. 1 and 2, a PEPS system 1, which may also be referred to as a localization system, is provided within a vehicle 30 and includes a communication gateway 29, a plurality of sensors 31A-31H, referred to collectively as sensors 31, and a plurality of door sensors 37A-37D, referred to collectively as door sensors 37. The PEPS system 1 includes one or more control modules 20 that are distributed throughout the vehicle 30 and are able to communicate with each other through, for example, a vehicle interface 45. In addition, some of the modules may be integrated into a single electronic control unit (ECU) or are able to communicate with each other using the vehicle interface 45. The vehicle interface 45, for example, may include a controller area network (CAN) bus for communication between main modules and/or lower data rate communication such as local interconnect network (LIN) for communication between the sensors 31 and/or the door sensors 37. The vehicle interface 45 can also include a clock extension peripheral interface (CXPI) bus. Additionally or alternatively, the vehicle interface 45 can include a combination of CAN bus, LIN, and CXPI bus communication interfaces. The structure of the sensors 31 are discussed in further detail below with reference to FIG. 3. The operability of the door sensors 37 are discussed in further detail below with reference to FIG. 5.

The control module 20 can include, for example, the communication gateway 29 that includes a BLE chipset 21 connected to an antenna 19. As shown in FIG. 2, the antenna 19 may be located in the vehicle 30. Alternatively, the antenna 19 may be located outside of the vehicle 30 or within the control module 20. The control module 20 can also include a link authentication module 22 that authenticates a user device 10 for communication via a communication link 50. The control module 20 can also include a data management layer 23 for push data. The control module 20 can also include a connection information distribution module 24. The control module 20 can also include a timing control module 25. The control module 20 can also include a telematics module 26, such as a global positioning system (GPS) module and/or other navigation or location modules. The control module 20 can also include a PEPS module 27. The control module 20 can also include a body control module 28. The control module 20 can also include a sensor processing and localization module 32. The control module 20 can also include a security filtering module 33.

The control module 20 can also include a user settings activation module 34, a user profile database 35, and an entry database 36, each of which are described below in further detail with reference to FIGS. 5-6. The control module 20 may also include one or more processors that are configured to execute instructions stored in a nontransitory memory, such as a read-only memory (ROM) and/or random access memory (RAM). Additionally, the user profile database 35 and the entry database 36 may be implemented by the nontransitory memory.

As shown in FIGS. 1 and 2, the user device 10 can communicate with the communication gateway 29 of the vehicle 30 via the communication link 50. Without limitation, the user device 10 may be any Bluetooth enabled communication device, such as a smart phone, smart watch, wearable electronic device, key fob, tablet device, or other device associated with a user of the vehicle 30, such as an owner, driver, passenger of the vehicle 30, and/or a technician for the vehicle 30. As noted above, other wireless communication protocols could be used in place of Bluetooth or BLE, such as Wi-Fi, Wi-Fi direct, UWB, and/or IR USB. The user device 10 can include a BLE chipset 11 connected to an antenna 13. The user device 10 can also include application software 12 stored in a computer-readable storage module or device, such as a read-only memory (ROM) or a random-access memory (RAM). Further, the application software 12 includes instructions that are executable by a processor of the user device 10. The user device 10 can also include a GPS module 14 or other device location service.

The user device 10 and the communication gateway 29 can establish the communication link 50 using a Bluetooth communication link, as provided for and defined by the Bluetooth specification. For example, the communication link 50 between the user device 10 and the communication gateway 29 can be a BLE communication link. Alternatively, as noted above, a Wi-Fi, Wi-Fi direct, UWB, and/or IR UWB communication link may be used in place of the BLE communication link.

The PEPS system 1 may be configured to provide additional authentication of the communication link 50 with the user device. For example, the communication gateway 29 can communicate with the link authentication module 22 to authenticate the user device 10 and establish the communication link 50. For example, the link authentication module 22 can be configured to implement challenge-response authentication. In such case, timing information about the communication between the communication gateway 29 and the user device 10 is sent to the timing control module 25, which communicates with the sensors 31 through the vehicle interface 45, as described below. Further, the communication gateway 29 can communicate information about communication channels and channel switching parameters to the connection information distribution module 24. The connection information distribution module 24 is configured to communicate with each of the sensors 31 using the vehicle interface 45 and to provide the sensors 31 with communication information necessary for the sensors 31 to find and then follow the communication link 50 once the sensors 31 are synchronized with the communication gateway 29.

While FIGS. 1 and 2 illustrate a PEPS system 1 with eight sensors 31A-31H, any number of sensors can be used. For example, the PEPS system can include six, seven, nine, ten, eleven, or more sensors. In this way, while the present disclosure provides an example utilizing eight sensors, additional or fewer sensors can be used in accordance with the present disclosure.

Figure 3:
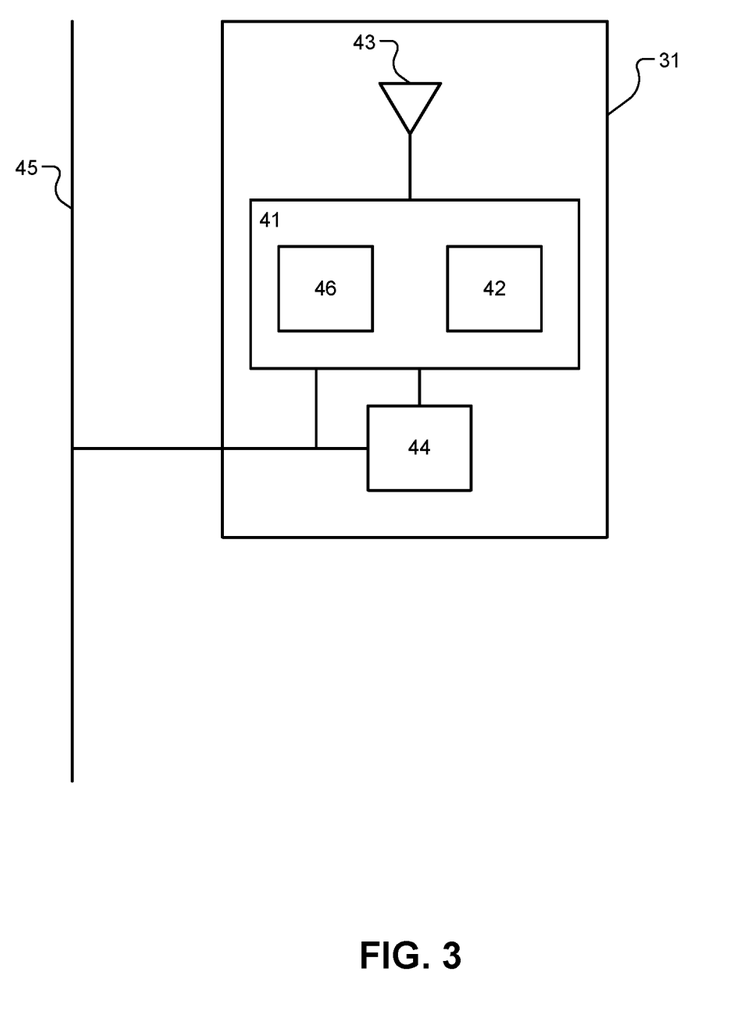
FIG. 3 illustrates a block diagram for a sensor of a PEPS system according to the present disclosure.

With reference to FIG. 3, each of the sensors 31 includes a BLE chipset 41 connected to an antenna 43. As shown in FIG. 3, the antenna 43 may be located internal to the sensors 31. Alternatively, the antenna 43 may be located external to the sensors 31. The sensors 31 receive BLE Signals using the antenna 43 and, specifically, receive BLE physical layer messages using a BLE physical layer (PHY) controller 46. The sensors 31 are capable of observing BLE physical layer messages and taking measurements of the physical properties of the associated signals, including, for example, the received signal strength (RSSI) using a channel map that is produced by a channel map reconstruction module 42. Additionally or alternatively, the sensors 31 can determine other measurements of the physical properties of the associated signals, including, for example, data related to the angle of arrival. Additionally or alternatively, the sensors 31 can communicate with each other and/or communicate with the communication gateway 29 via the vehicle interface 45 to determine time difference of arrival, time of arrival, or angle of arrival data for signals received by multiple sensors. Additionally or alternatively, the sensors 31 can measure and determine round trip time of flight information about signals sent and received to and from the user device 10. The sensors 31 receive timing information and channel map information from the communication gateway 29 via the vehicle interface 45. A timing synchronization module 44 is configured to accurately measure the reception times of messages on the vehicle interface 45 and pass the timing information to the BLE chipset 41. The BLE chipset 41 is configured to take the channel map information and the timing signals and to tune the PHY controller 46 to a specific channel at a specific time and observe all physical layer messages and data that conform to the Bluetooth physical layer specification, which includes the normal data rates proposed or adopted, for example, in the Bluetooth Specification version 5.0. The data, timestamps and measured signal strength are reported by the BLE chipset 41 to the communication gateway 29, or other control module 20, of the vehicle 30 via the vehicle Interface 45.

Figure 4:
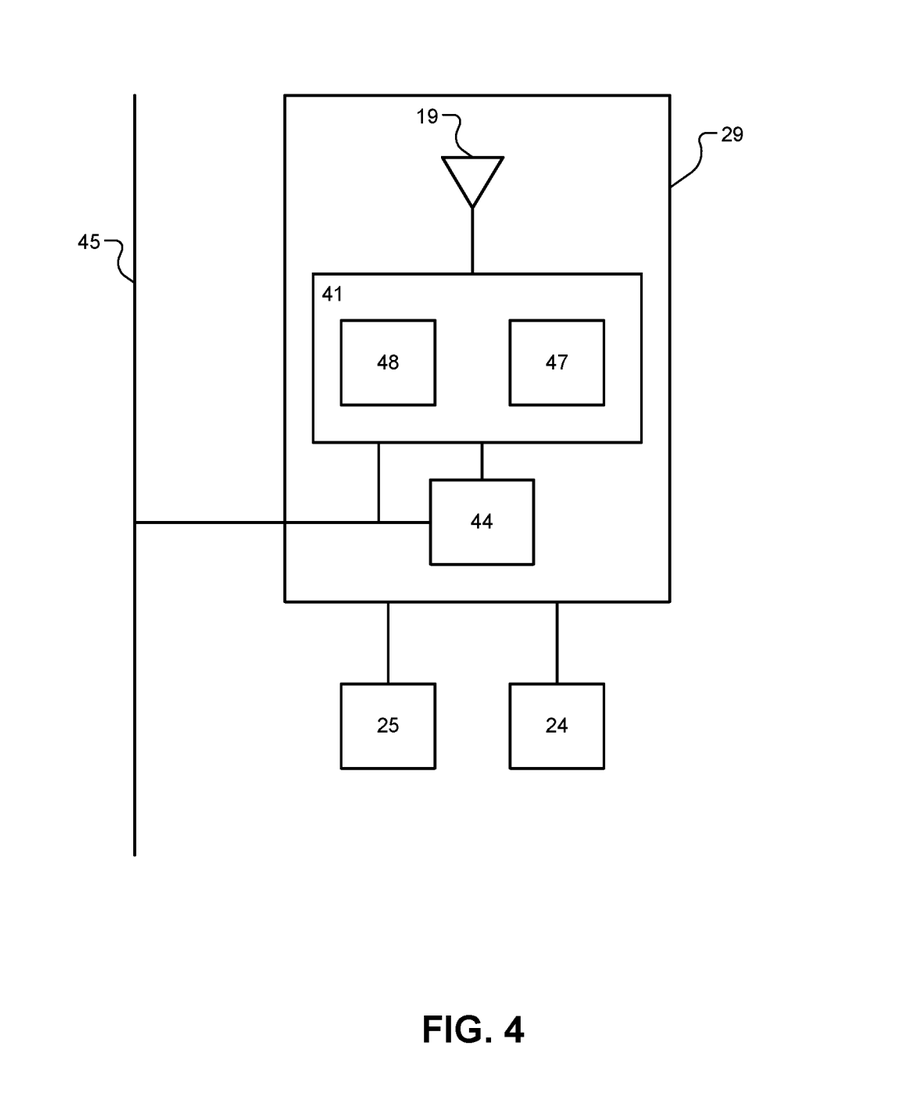
FIG. 4 illustrates a communication gateway of a PEPS system according to the present disclosure.

With reference to FIG. 4, the communication gateway 29 includes a BLE chipset 41 connected to an antenna 19 to receive BLE Signals. The BLE chipset 41 implements a Bluetooth protocol stack 48 that is, for example, compliant with the BLE specification, including, for example, version 5 of the BLE specification. The BLE chipset 41 also includes an application 47 implemented by application code stored in a computer-readable medium, such as a read-only memory (ROM) or a random-access memory (RAM). Further, the application 47 includes instructions that are executable by a processor of the BLE chipset 41. The application 47 may include modifications outside of the Bluetooth specification to enable the BLE chipset 41 to inspect timestamped data transmitted and received by the BLE chipset 41, regardless of the validity of the data. For example, the application 47 enables the BLE chipset 41 to compare transmitted and received data against expectations. The communication gateway 29 is configured to transmit the actual transmitted and received data to vehicle systems of the vehicle 30 via the vehicle interface 45. Alternatively, the communication gateway 29 can be configured to receive the data from each of the sensors 31 via the vehicle interface 45. The application 47 can be further configured to enable the BLE chipset 41 to confirm that each of the sensors 31 has received the correct data at the correct time.

With continued reference to FIG. 4, the communication gateway 29 is further configured to provide information about ongoing connections and timing signals necessary for each of the sensors 31 to find the connection being maintained by the communication gateway 29 with the user device 10, for example, and to subsequently follow the connection. The Bluetooth protocol stack 48 is configured to provide the channel map, access identifier, next channel, and the time to the next channel to the application 47. The Bluetooth protocol stack 48 is configured to output timing signals for the timestamps of transmission and reception events to the application 47 and/or a digital PIN output of the BLE chipset 41. The communication gateway 29 also includes a timing synchronization module 44. The timing synchronization module 44 is configured to accept the timing signals and works in conjunction with the vehicle interface 45 to create accurate time stamps of connection information messages and other communications.

Figure 5:
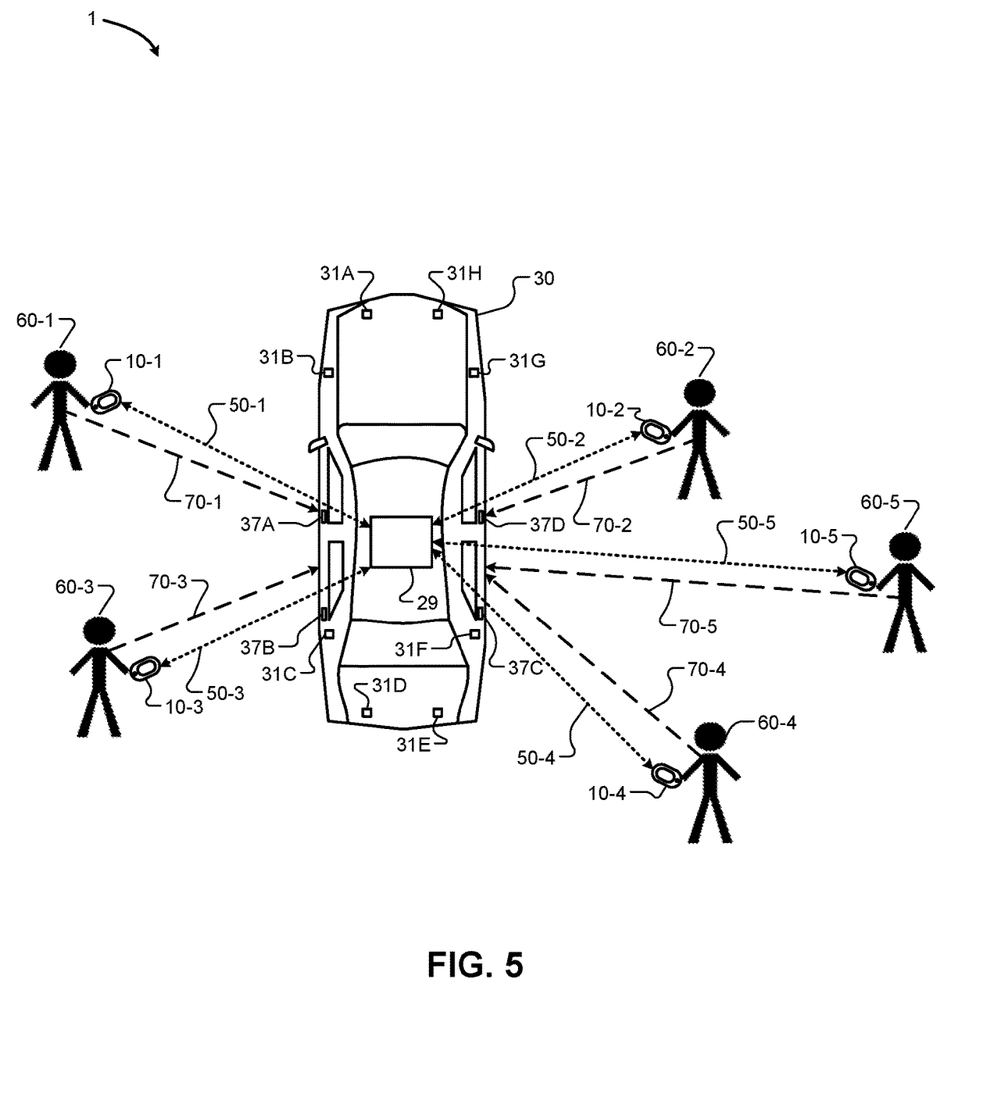
FIG. 5 illustrates a subject vehicle with a PEPS system according to the present disclosure.

With reference to FIG. 5, the PEPS system 1 is provided within the vehicle 30 and includes the communication gateway 29 and the sensors 31. As described above, the sensors 31 are configured to take measurements of the physical properties of the BLE signal transmitted by the user device 10 to the communication gateway 29 via the communication link 50. The sensors 31 may measure, for example, the RSSI of the BLE signal and data related to the angle of arrival of the communication link 50. Additionally, the sensors 31 may be configured to determine the time difference of arrival, time of arrival, angle of arrival, and/or round trip time of flight data of the BLE signal. Using the physical properties and/or data of the BLE signal, the communication gateway 29 may then determine a distance between the user device 10 and the vehicle 30.

As an example, in response to the communication gateway 29 being connected to the user device 10 via the communication link 50, the communication gateway 29 may provide the sensors 31 data corresponding to the BLE signal transmitted by the user device 10. In response to the data corresponding to the BLE signal provided by the communication gateway 29 matching the data corresponding to a BLE signal acquired by the sensors 31 from the user device 10 (e.g., a BLE communication packet received by the sensors 31 from the communication gateway 29 matches the BLE communication packet received by the sensors 31 from the user device 10), the sensors 31 are configured to generate RSSI measurements of the BLE signal.

As a specific example, if user 60-1 of the user device 10-1 walks along path 70-1, sensor 31B may generate an RSSI measurement having a first value, sensor 31A and sensor 31C may generate RSSI measurements having a second value, etc. As another example, if user 60-2 of the user device 10-2 walks along path 70-2, sensor 31G may generate an RSSI measurement having a third value, sensor 31H and sensor 31F may generate RSSI measurements having a fourth value, etc. Additionally, if user 60-3 of user device 10-3 walks along path 70-3, sensor 31C may generate an RSSI measurement having a fifth value, sensor 31D and sensor 31B may generate RSSI measurements having a sixth value, etc. Furthermore, if user 60-4 of user device 10-4 walks along path 70-4, sensor 31F may generate an RSSI measurement having a seventh value, sensor 31E and sensor 31G may generate RSSI measurements having an eighth value, etc. Additionally, if user 60-5 of user device 10-5 walks along path 70-5, sensor 31F may generate an RSSI measurement having a ninth value, sensor 31E and sensor 31G may generate RSSI measurements having a tenth value, etc.

The sensors 31 may provide the RSSI measurements to the control module 20. In response to the control module 20 receiving the RSSI measurements from the sensors 31, the control module 20 may determine the location of the user device 10, the distance between the user device 10 and the vehicle 30, and/or trajectory of the user device 10 based on the RSSI measurements received from the sensors 31 based on the RSSI measurements received from the sensors 31. As an example, the control module 20 may determine that the user of the user device 10-1 traveled on path 70-1 based on the first value, second value, and any other values obtained by the sensors 31 as the user traveled along path 70-1. Furthermore, the control module 20 may determine that the user 60-1 of the user device 10-1 moved towards the driver-side door of the vehicle, entered the vehicle through the driver-side door, and is located in the driver seat based on the determined locations of the user device 10-1 determined, in turn on the first value, second value, etc., and any other values obtained by the sensors 31 as the user traveled along path 70-1. Likewise, the control module 20 may determine the location and/or trajectory of users 60-2, 60-3, 60-4, 60-5 based on the RSSI measurements received by the control module 20 while traveling on paths 70-2, 70-3, 70-4, 70-5, respectively.

In other embodiments, the communication gateway 29 may receive the RSSI measurements from the sensors 31 and determine the location of the user devices 10, the distance between the user devices 10 and the vehicle 30, and/or trajectory of the user devices 10 based on the RSSI measurements received from the sensors 31.

In addition to the control module 20 determining the location of the user devices 10 based on the RSSI measurements generated by the sensors 31, the control module 20 may also use sensor data from the door sensors 37 to determine the location of the user devices 10. In one embodiment, the door sensors 37 are configured to detect whether a corresponding door is open and can be used to detect or determine whether the user of the user device 10 enters a corresponding door. As an example, door sensor 37A is configured to detect whether the user of the user device 10 enters through the driver-side front door; door sensor 37B is configured to detect whether the user of the user device 10 enters through the driver-side rear door; door sensor 37C is configured to detect whether the user of the user device 10 enters through the passenger-side front door; and door sensor 37D is configured to detect whether the user of the user device 10 enters through the passenger-side rear door.

In one embodiment, the door sensors 37 may be implemented by a variety of magnetic sensors. As an example, a magnetic strip of each the door sensors 37 may be placed on the vehicle 30, and each of the door sensors 37 may include an opposing magnetic strip coupled to a corresponding door. Additionally, the opposing magnetic strips may include a wire that is in communication with the control module 20. As such, when one of doors of the vehicle 30 is open, such as the driver-side front door, the corresponding door sensor (door sensor 37A) may provide a signal to the control module 20 that the circuit of door sensor 37A is open and, in response to receiving the signal, the control module 20 may determine that the corresponding door is open. While this embodiment describes the door sensors 37 being implemented by magnetic sensors, the door sensors 37 may be implemented by other types of sensors understood by one of ordinary skill in the art.

In addition to the control module 20 determining whether a corresponding door is open based on sensor data provided by the door sensors 37, the control module 20 may be configured to determine that a user of the user device 10 has entered the vehicle 30 if the corresponding door is subsequently closed and the user device 10 is located within the vehicle 30. As an example, if door sensor 37A provides a signal to the control module 20 that indicates the driver-side front door is open, the control module 20 may wait for door sensor 37A to provide a second signal indicating that the driver-side front door is closed (e.g., the door sensor 37A provides a signal to the control module 20 indicating that the circuit of door sensor 37A is closed).

Once the control module 20 determines that the user of the user device 10 is in the vehicle 30, the control module 20 may generate an entry corresponding to the user device 10, and the entry may be stored in the entry database 36. The entry may include information describing, for example, identifying information associated with the user device 10; a user profile associated with the user of the user device 10; which door the user of the user device 10 entered; a determined location based on the RSSI associated with the user device 10; and a timestamp associated with the user's entry into the vehicle 30.

If more than one entry is generated (i.e., more than one user enters the vehicle 30), the entry may also include information associated with location data of the corresponding user device 10 within the vehicle 30. As an example, the entry may include information corresponding to whether the user device 10 is seated at one of the driver seat, the passenger seat, or any of the rear seats based on the RSSI associated with the user device 10.

Once the vehicle 30 is turned on by the driver and/or in operation, the control module 20 identifies the total number of entries and the information included in each of the entries of the entry database 36. Based on the number and/or information included in each of the entries of the entry database 36, the user settings activation module 34 may identify corresponding user profiles stored in the user profile database 35. The user profile database 35 may include a plurality of user profiles that include a plurality of user settings, such as mirror positions, a steering wheel position, a seat position, a seat height, a grip position of the steering wheel, and/or other settings associated with the user. The user profiles may also include information corresponding to other tuning and/or customization settings, such as speed limits (e.g., if the user of the vehicle 30 is the driver, the vehicle 30 may have a setting forbidding the user from traveling over 60 mph), zone limits (e.g., if the user of the vehicle 30 is the driver, the user may not be permitted to drive on certain highways and/or streets), acceleration limits (e.g., if the user of the vehicle 30 is the driver, the user may not be permitted to quickly accelerate when the vehicle 30 is completely stopped) and/or other tuning and/or customization settings. The user profiles may also include information corresponding to preferred climate conditions (e.g., the user prefers his or her footwell of the vehicle 30 to be 68° F.) and media/audio settings (e.g., if the user is the driver, the volume of the nearest vehicle speakers may be set to a certain volume level).

Additionally or alternatively, the user profile database 35 may include a plurality of user profiles that are designated by an owner/operator of the vehicle 30 as permitted occupants of the vehicle 30. Therefore, when a user of the user device 10 enters the vehicle 30, and the control module 20 determines that the user of the user device 10 is in the vehicle, the user settings activation module 34 may initially search for user profiles in the user profile database 35. If the user settings activation module 34 does not identify a corresponding user profile, the user settings activation module 34 may search a global remote user profile database (not shown) to determine if the corresponding user profile is stored therein, thereby preserving processing resources of the user settings activation module 34 and minimizing latency in identifying the corresponding user profile. If the corresponding profile is stored in the global remote user profile database, the user settings activation module 34 may update the user profile database 35 with the corresponding user profile information.

Once the user settings activation module 34 has identified the corresponding user profiles, the user settings activation module 34 may activate various vehicle functions based on the identified user profiles. As an example, if the control module 20 identifies one entry once the vehicle 30 is turned on and/or moving, the user settings activation module 34 may determine that the entry corresponds with a driver of the vehicle 30. The user settings activation module 34 subsequently identifies a user profile in the user profile diabase 35 that is associated with the driver and is based on the identifying information included in the entry. In response to identifying the user profile associated with the driver, the user settings activation module 34 may activate certain vehicle functions based on the identified user profile, such as setting mirror positions, adjusting a steering wheel position, adjusting a seat position of the driver, modifying climate control settings, and adjusting audio/media settings.

Additionally, if the control module 20 identifies more than one entry once the vehicle 30 is turned on and/or moving, the user settings activation module 34 may determine that a second entry corresponds with a passenger of the vehicle 30. The user settings activation module 34, using the second entry, subsequently may identify a user profile in the user profile diabase 35 that is associated with the passenger and is based on the identifying information included in the second entry. In response to identifying the user profile, the user settings activation module 34 may activate certain vehicle functions based on the user profile, such as adjusting the seat position of the passenger, adjusting climate control settings, and adjusting audio/media settings. The control module 20 may perform this operation for each entry of a plurality of entries that are stored in the entry database 36.

Furthermore, based on each entry and corresponding user profile that is not associated with the driver of the vehicle 30, the user settings activation module 34 may be configured to activate vehicle functions based on a position of each passenger within the vehicle 30. As an example, using the RSSI associated with each entry, the control module 20 may determine that a first passenger is located in the passenger-side front seat, and a second passenger is located in a driver-side rear seat of the vehicle 30. Accordingly, the user settings activation module 34 may adjust the climate control settings of the passenger-side front seat area based on the first passenger's user profile, and the first passenger's user profile may include instructions for generating, using a heating system, heat at a first temperature in the passenger-side front seat footwell area. Furthermore, the user settings activation module 34 may adjust the climate control settings of the driver-side rear seat area based on the second passenger's user profile, and the second passenger's user profile may include instructions for generating, using the heating system, heat at a second temperature in the driver-side rear footwell area.

Additionally or alternatively, if more than one passenger is located in the rear seating area of the vehicle 30, the user settings activation module 34 may be configured to activate vehicle functions based on the position of each passenger in the rear seating area of the vehicle 30. As an example, using the RSSI associated with each entry, the control module 20 may determine that a first passenger is located in a driver-side rear seat of the vehicle 30, and a second passenger is located in a passenger-side rear seat of the vehicle 30. Accordingly, the user settings activation module 34 may adjust the climate control settings of the driver-side rear seat area based on the first passenger's user profile, which may include instructions for generating, using the heating system, heat at a first temperature in a driver-side rear footwell area. Furthermore, the user settings activation module 34 may adjust the climate control settings of the passenger-side rear seat area based on the second passenger's user profile, which may include instructions for generating, using the heating system, heat at a second temperature in a passenger-side rear footwell area.

In other embodiments in which the rear seating area does not include individually adjustable vehicle function settings, (e.g., the rear seating area does not provide the option to modify climate control settings for each individual rear seating area), the user settings activation module 34 may activate vehicle functions based on at least one of a priority associated with each user profile, a mathematical operation performed on data of each user profile, and a random selection of vehicle function settings. As an example, using the RSSI associated with each entry, the control module 20 may determine that a first passenger is located in a driver-side rear seat of the vehicle 30, a second passenger is located in a middle rear seat of the vehicle 30, and a third passenger is located in a passenger-side rear seat of the vehicle 30. Accordingly, the user settings activation module 34 may adjust the climate control settings of the rear seating area such that the heating system generates heat at a first temperature based on a user profile associated with the first passenger if the corresponding user profile includes information indicating that the first passenger has priority over the second and third passengers. Alternatively, the user settings activation module 34 may adjust the climate control settings of the rear seating area such that the heating system generates heat at an average temperature, and the average temperature is a mean of the temperature settings corresponding to the user profiles of each of the first, second, and third passengers. As another example, the user settings activation module 34 may adjust the climate control settings of the rear seating area such that the heating system generates heat at a third temperature based on a user profile associated with third passenger if the user profile is randomly selected by the user settings activation module 34.

Once the vehicle 30 is on and the user settings activation module 34 has activated all vehicle functions designated in the identified user profiles, the user settings activation module 34 or the control module 20 may delete each entry in the entry database 36. As such, the control module 20 and the user settings activation module 34 may continuously detect user devices 10, identify corresponding user profiles, and activate vehicle functions based on the identified user profiles, as described above.

Figure 6:
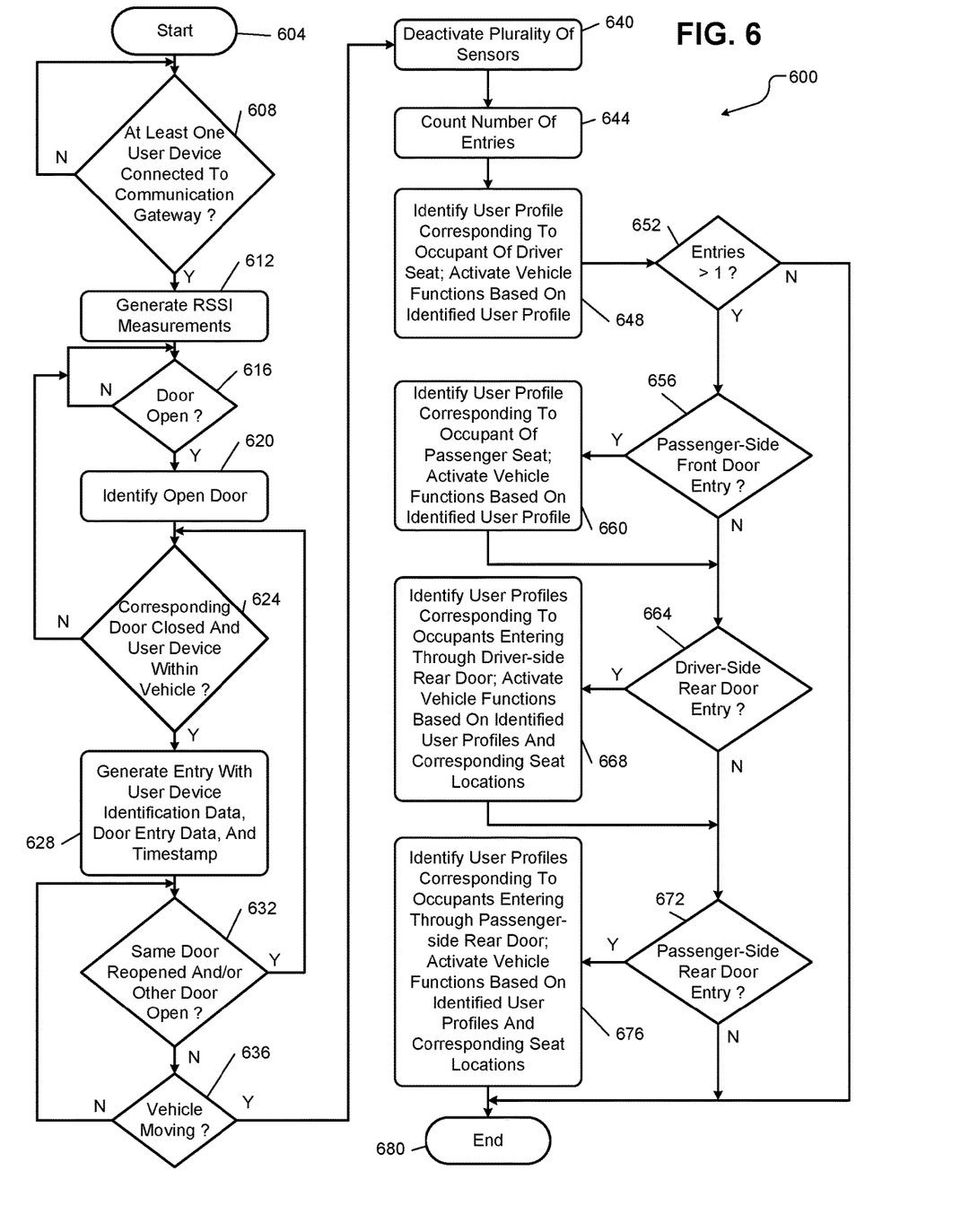
FIG. 6 illustrates a flowchart of an example algorithm for activating vehicle functions based on the occupants of the vehicle according to the present disclosure.

With reference to FIG. 6, an example flowchart of an algorithm 600 for activating vehicle functions based on the occupants of the vehicle is shown. The control algorithm 600 begins at 604, when at least one of the user devices 10 is turned on. At 608, the control algorithm 600 determines whether at least one of the user devices 10 is connected to the communication gateway 29. If so, the control algorithm 600 proceeds to 612; otherwise, the control algorithm 600 remains at 608 until at least one of the user devices 10 is connected to the communication gateway 29.

At 612, the control algorithm 600 generates, using the sensors 31, RSSI measurements based on the BLE signals. At 616, the control algorithm 600 determines, using the control module 20, whether one of the doors of the vehicle 30 is open. If so, the control algorithm 600 proceeds to 620; otherwise, the control algorithm 600 remains at 616 until at least one of the doors of the vehicle 30 is open. At 620, the control algorithm 600, using the control module 20, identifies the open door. As an example, the control module 25 may receive a signal from one of the door sensors 37 that indicates the corresponding door of the vehicle 30 is open. At 624, the control algorithm 600, using the control module 20, determines whether the corresponding door is closed and whether the user device 10 is located within the vehicle 30. As an example, the control module 20 may determine the corresponding door is closed in response to receiving the second signal indicating that the open door is subsequently closed, as described above. Furthermore, the control module 20 may determine the user device 10 is within the vehicle 30 based on the output of sensors 31C and 31G, as described above. If the corresponding door is closed and the user device 10 is located within the vehicle 30, the control algorithm 600 proceeds to 628; otherwise, the control algorithm 600 proceeds to 616.

At 628, the control algorithm 600, using the control module 20, generates an entry and stores it in the entry database 36, as described above. Moreover, the entry may include information describing, for example, identifying information associated with the user device 10; a user profile associated with the user of the user device 10; which door the user of the user device 10 entered; an RSSI associated with the user device 10; and a timestamp associated with the user's entry into the vehicle 30, as described above. At 632, the control algorithm 600, using the control module 20, determines whether the corresponding door is reopened and/or another door of the vehicle 30 is open. If so, the control algorithm 600 proceeds to 624; otherwise, the control algorithm 600 proceeds to 636.

At 636, the control algorithm 600 determines, using the control module 20, whether the vehicle 30 is moving. If so, the control algorithm 600 proceeds to 640; otherwise, the control algorithm 600 proceeds to 632. At 640, the control algorithm 600 deactivates, using the control module 20, the plurality of sensors 31. At 644, the control algorithm 600 counts the number of entries in the entry database 36.

At 648, the control algorithm 600 identifies, using the user settings activation module 34, the user profile corresponding to the occupant of the driver seat from the user profile database 35. Furthermore, the user settings activation module 34 activates vehicle functions based on the identified user profile, as described above. At 652, the control algorithm 600 determines, using the user settings activation module 34, the number of entries in the entry database 36. If there is more than one entry, the control algorithm 600 proceeds to 656; otherwise, the control algorithm 600 proceeds to 680 and ends.

At 656, the control algorithm 600 determines, using the user settings activation module 34, whether any of the entries include information indicating that a user of the user device entered the passenger-side front door. If so, the control algorithm 600 proceeds to 660; otherwise, the control algorithm 600 proceeds to 664. At 660, the control algorithm 600 identifies, using the user settings activation module 34, the user profile corresponding to the occupant of the passenger seat from the user profile database 35. Furthermore, the user settings activation module 34 activates vehicle functions based on the identified user profile, as described above. The control algorithm 600 then proceeds to 664.

At 664, the control algorithm 600 determines, using the user settings activation module 34, whether any of the entries include information indicating that a user of the user device 10 entered the driver-side rear door. If so, the control algorithm 600 proceeds to 668; otherwise, the control algorithm 600 proceeds to 672. At 668, the control algorithm 600 identifies, using the user settings activation module 34, the user profiles corresponding to the occupants that entered through the driver-side rear door from the user profile database 35. Furthermore, the user settings activation module 34 activates vehicle functions based on the identified user profiles and the corresponding seat locations indicated by, for example, the location data of the corresponding entries, as described above. The control algorithm then proceeds to 672.

At 672, the control algorithm 600 determines, using the user settings activation module 34, whether any of the entries include information indicating that a user of the user device 10 entered the passenger-side rear door. If so, the control algorithm 600 proceeds to 676; otherwise, the control algorithm 600 proceeds to 680. At 676, the control algorithm 600 identifies, using the user settings activation module 34, the user profiles corresponding to the occupants that entered through the passenger-side rear door from the user profile database 35. Furthermore, the user settings activation module 34 activates vehicle functions based on the identified user profiles and the corresponding seat locations indicated by, for example, the location data of the corresponding entries, as described above. The control algorithm 600 then ends at 680.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
a communication gateway of a control module of a vehicle, the communication gateway being configured to establish wireless communication connections with a plurality of user devices;
a plurality of sensors that are configured to, in response to the plurality of user devices being connected to the communication gateway, communicate signal information about the wireless communication connections to the control module, wherein the signal information indicates characteristics of the wireless communication connections; and
a plurality of door sensors associated with a plurality of doors of the vehicle, each door sensor generating door sensor data indicating whether an associated door of the vehicle is open or closed, the plurality of doors including a driver door for a driver seat of the vehicle, a front passenger door for a front passenger seat of the vehicle, and at least one rear door for rear seats of the vehicle;
wherein the control module includes at least one processor that is configured to execute instructions stored in a nontransitory memory, and the control module is configured to (i) determine a location and a trajectory of each user device of the plurality of user devices based on the signal information as each user device approaches the vehicle, (ii) determine whether each door of the plurality of doors was opened and subsequently closed, (iii) determine a seat position associated with each user device of the plurality of user devices based on the location and the trajectory of each user device and based on whether each door of the plurality of doors of the vehicle was opened and subsequently closed, the seat position indicating that the associated user device is located in one of: the driver seat, the front passenger seat, or the rear seats, (iv) determine a plurality of user profiles, including a user profile associated with each user device of the plurality of user devices, each user profile having a priority and a preferred temperature associated with the user profile, (v) determine whether multiple user devices are located in the rear seats, (vi) in response to determining that multiple user devices are located in the rear seats, compare the priority associated with each user device of the multiple user devices to determine the user profile having the highest priority of the user profiles associated with the multiple user devices located in the rear seats, and (vii) adjust climate control settings of a climate control system for a rear seating area of the vehicle that includes the rear seats based on the preferred temperature associated with the user profile having the highest priority of the user profiles associated with the multiple user devices located in the rear seats.

2. The system of claim 1, wherein in response to a first user profile of the user profiles being associated with a first user device located in the driver seat of the vehicle, the control module is configured to activate at least one vehicle function by at least one of adjusting a mirror of the vehicle, adjusting a steering wheel of the vehicle, applying speed limits to the vehicle, applying zone limits to the vehicle, and applying acceleration limits to the vehicle based on the first user profile.

3. The system of claim 1, wherein the wireless communication connections are Bluetooth low energy (BLE) communication connections.

4. The system of claim 1, wherein in response to a first user profile of the user profiles being associated with a first user device located in the driver seat of the vehicle, the control module is configured to activate at least one vehicle function by at least one of adjusting (i) a seat position, (ii) a seat height, (iii) climate conditions of the vehicle, (iv) media settings, and (v) audio settings based on the first user profile.

5. The system of claim 1, wherein the signal information includes a received signal strength (RSSI) of each of the wireless communication connections.

6. The system of claim 1, wherein the signal information includes at least one of a time difference of arrival of each of the wireless communication connections, a time of arrival of each of the wireless communication connections, an angle of arrival of each of the wireless communication connections, and a round trip time of flight of each of the wireless communication connections.

7. A method comprising:
establishing, using a communication gateway of a control module of a vehicle, wireless communication connections with a plurality of user devices, wherein the control module includes at least one processor that is configured to execute instructions stored in a nontransitory memory;
communicating, in response to the plurality of user devices being connected to the communication gateway and using a plurality of sensors, signal information about the wireless communication connections to the control module, wherein the signal information indicates characteristics of the wireless communication connections;
generating, with each door sensor of a plurality of door sensors associated with a plurality of doors of the vehicle, door sensor data indicating whether an associated door of the vehicle is open or closed, the plurality of doors including a driver door for a driver seat of the vehicle, a front passenger door for a front passenger seat of the vehicle, and at least one rear door for rear seats of the vehicle;
determining, using the control module, a location and a trajectory of each user device of the plurality of user devices based on the signal information as each user device approaches the vehicle;
determining, using the control module, whether each door of the plurality of doors was opened and subsequently closed;
determining, using the control module, whether a seat position associated with each user device of the plurality of user devices based on the location and the trajectory of each user device and based on whether each door of the plurality of doors of the vehicle was opened and subsequently closed, the seat position indicating that the associated user device is located in one of: the driver seat, the front passenger seat, or the rear seats;
determining, using the control module, a plurality of user profiles, including a user profile associated with each user device of the plurality of user devices, each user profile having a priority and a preferred temperature associated with the user profile;
determining, using the control module, whether multiple user devices are located in the rear seats;
comparing, using the control module and in response to determining that multiple user devices are located in the rear seats, the priority associated with each user device of the multiple user devices to determine the user profile having the highest priority of the user profiles associated with the multiple user devices located in the rear seats; and
adjusting, using the control module, climate control settings of a climate control system for a rear seating area of the vehicle that includes the rear seats based on the preferred temperature associated with the user profile having the highest priority of the user profiles associated with the multiple user devices located in the rear seats.

8. The method of claim 7, further comprising, in response to a first user profile of the user profiles being associated with a first user device located in the driver seat of the vehicle, activating the at least one vehicle function includes at least one of adjusting a mirror of the vehicle, adjusting a steering wheel of the vehicle, applying speed limits to the vehicle, applying zone limits to the vehicle, and applying acceleration limits to the vehicle based on the first user profile.

9. The method of claim 7, wherein the wireless communication connections are Bluetooth low energy (BLE) communication connections.

10. The method of claim 7, further comprising, in response to a first user profile of the user profiles being associated with a first user device located in the driver seat of the vehicle, activating the at least one vehicle function includes at least one of adjusting (i) a seat position, (ii) a seat height, (iii) climate conditions of the vehicle, (iv) media settings, and (v) audio settings based on the first user profile.

11. The method of claim 7, wherein the signal information includes a received signal strength (RSSI) of each of the wireless communication connections.

12. The method of claim 7, wherein the characteristics include at least one of a time difference of arrival of each of the wireless communication connections, a time of arrival of each of the wireless communication connections, an angle of arrival of each of the wireless communication connections, and a round trip time of flight of each of the wireless communication connections.

\* \* \* \* \*